United States Patent

[11] 3,595,108

[72] Inventor Istvan Priscsak
      New Milford, Conn.
[21] Appl. No. 833,337
[22] Filed June 16, 1969
[45] Patented July 27, 1971
[73] Assignee Benrus Corporation
      Ridgefield, Conn.

[54] APPARATUS FOR IMPARTING A NON-CIRCULAR SHAPE TO AN ARTICLE
     15 Claims, 6 Drawing Figs.

[52] U.S. Cl. .................................................. 82/18
[51] Int. Cl. ................................................. B23b 5/44
[50] Field of Search ........................................... 82/18

[56] References Cited
     UNITED STATES PATENTS
     222,901  12/1879  Heckendorn ................. 82/18
     2,290,341  7/1942  Levitt ......................... 82/18
     2,625,832  1/1953  Lowe ........................... 82/18 X
     3,066,560  12/1962  Estephanio ................. 82/18

Primary Examiner—Leonidas Vlachos
Attorney—James and Franklin

ABSTRACT: Apparatus for rotating an article relative to a cutting means, characterized by a flexible inner shaft which is rotatable within an outer shaft and connected thereto in a manner which is effective to superimpose the rotation of the outer shaft on the inner shaft. The inner shaft is flexed to a position at which its axis of rotation is eccentrically located relative to the axis of rotation of the outer shaft. Means are provided to rotate the shafts at different speed simultaneously, and the article, which is held in a chuck at the end of the inner shaft, is therefore turned at one rotative speed and eccentrically moved at a different rotative speed. Thus, when this article contacts a cutting tool, a noncircular shape is imparted thereto, the shape being varied by changing the respective speeds of the shaft and/or the degree of eccentricity of the inner shaft with respect to the outer shaft.

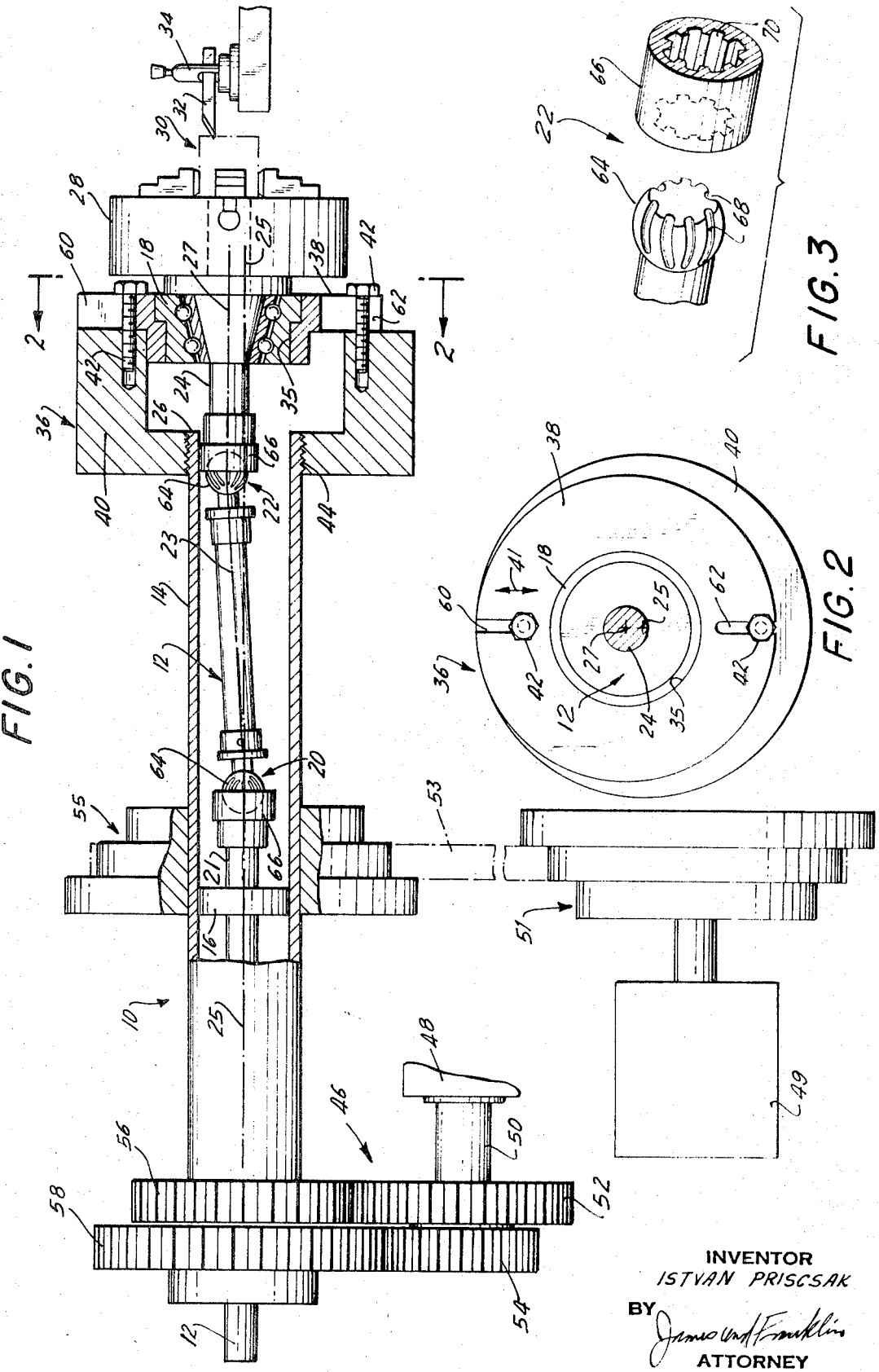

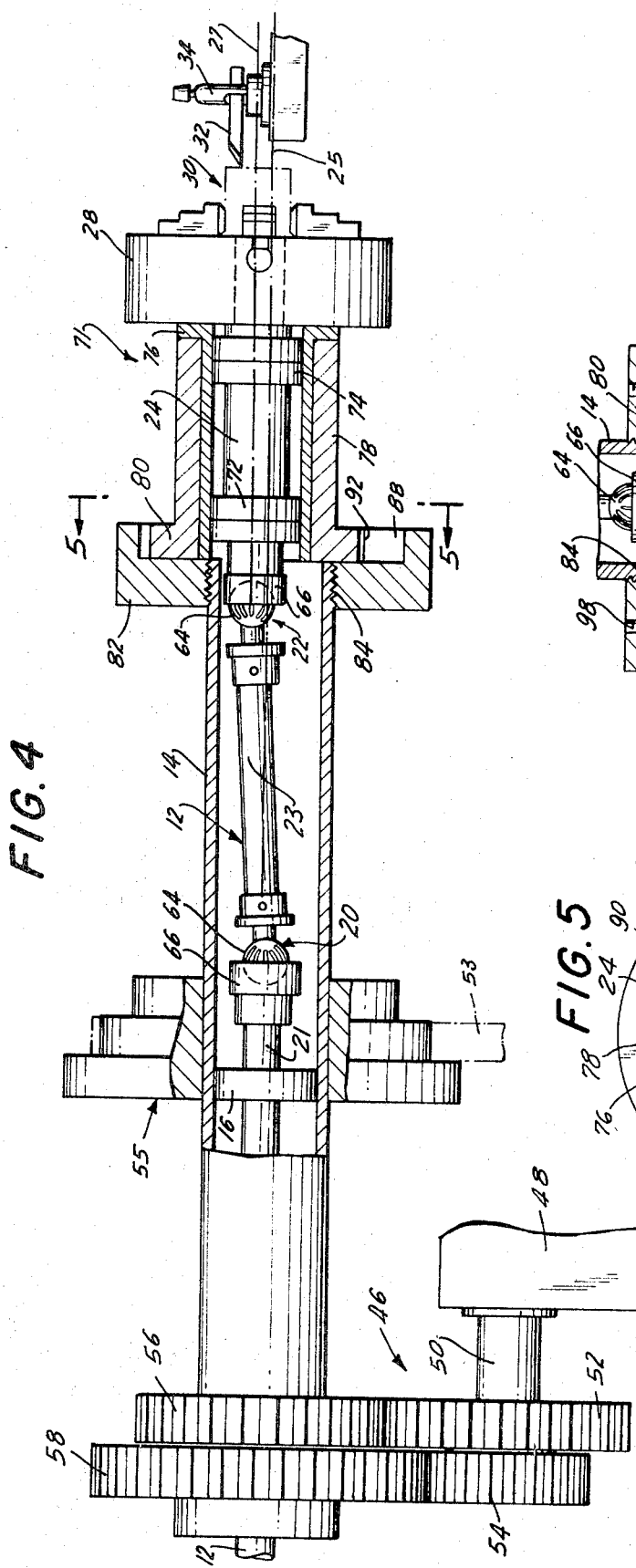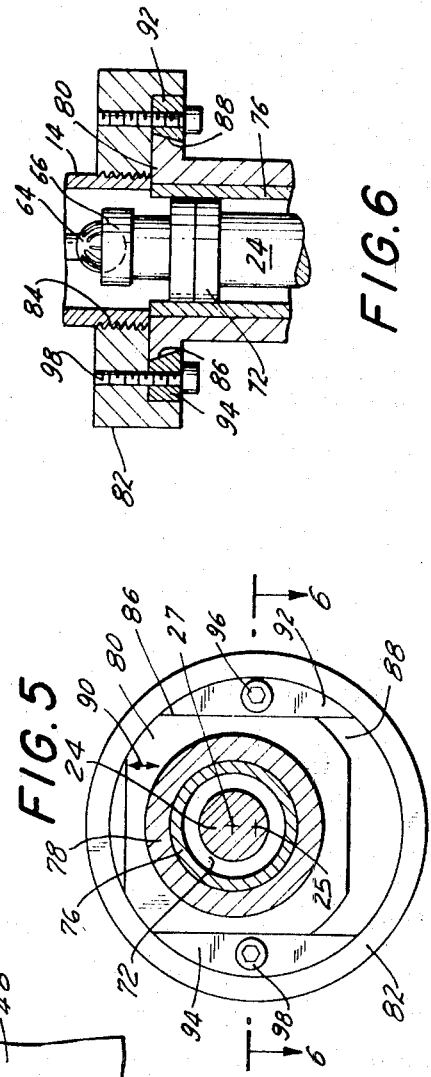

APPARATUS FOR IMPARTING A NON-CIRCULAR SHAPE TO AN ARTICLE

This invention relates to machine tools, and more particularly to an improved apparatus for use in machining articles to noncircular shapes.

It has become necessary in certain fields to machine parts or objects having outer surfaces which are noncircular in shape. Such configurations cannot be machined by the use of ordinary lathes or other standard machines which have rotationally driven moving parts. Rather, such parts have to be machined by employing special tools which are quite costly, or by individual manual manipulation which is not only expensive but often inaccurate. Usually, the noncircular shapes are cut by following profiles which guide the tools in a predetermined path. The accuracy of such a procedure depends in part on the accuracy of the profile guide member, and in part on the rigidity of this guide member as it is held against the cutting tool.

A number of devices have recently been developed which are designed to perform the task of providing a noncircular profile on an object. These devices generally employ grinding wheels or milling cutters so arranged that the oscillatory motion of the cutting tool imparts the desired shape to the article. In other devices, the workpiece itself is eccentrically mounted on a lathe by means of somewhat elaborate equipment and then engages the cutting tool while it eccentrically rotates. Generally, these devices are effective to impart the proper shape to the article, but invariably require equipment which is quite complex and difficult to operate.

It is therefore the primary object of this invention to provide an apparatus which is capable of imparting a noncircular shape to an article quickly, efficiently and accurately. Another object is to provide such an apparatus which is characterized by a compact and efficient arrangement of the various moving parts. Still another object of the invention is to provide such an apparatus by a simple modification of conventional machine equipment such as a standard lathe.

Broadly, the objects of the invention are achieved by an apparatus which comprises a rotatable outer shaft, an inner shaft positioned within the outer shaft and rotatable relative thereto, and means to flex the inner shaft so that the axis of rotation of the inner shaft is eccentrically positioned relative to the axis of rotation of the outer shaft. A holding means is connected to one end of the inner shaft and the workpiece or article to be fabricated is held in the holding means. Means are provided operatively connecting this end of the inner shaft to the outer shaft and effective to cyclically move the inner shaft end relative to the rotational axis of the outer shaft as the outer shaft rotates. A cutting tool is positioned adjacent the holding means during the operation of the apparatus and engages the rotating article. Driving means are included to rotate the outer shaft and the inner shaft at different rotational speeds simultaneously so that the holding means (and thus the article) is turned at one rotative speed and eccentrically moved at a different rotative speed. The difference in the speeds will determine the particular configuration which is imparted to the article. For example, a triangular profile will be produced if the ratio of the inner shaft speed to the outer shaft speed is 3:1 while a ratio of 4:1 produces a profile having four sides.

The depth of the profile cut will depend upon the degree of eccentricity between the inner shaft and the outer shaft. Means are therefore provided to adjust the position of the inner shaft relative to the outer shaft to vary this degree of eccentricity. In the preferred embodiment, the means includes a first member positioned about the outer race of a bearing, the bearing being positioned over the inner shaft at the end of the shaft which is joined to the holding means. A second member is operatively connected between the first member and the outer shaft. The first member is movable relative to the second member and when it is relatively moved it carries the end of the inner shaft to a new position. In this manner the inner shaft is repositioned relative to the outer shaft in a direction to increase or decrease the eccentricity of the inner shaft relative to the outer shaft.

The inner shaft is caused to flex by the use of a flexible joint comprising first and second parts rotatively fixed to each other but angularly movable relative to each other. The inner shaft is constructed with first and second sections connected to the first and second parts respectively and to the driving means and the end of the shaft connected to the holding means. Two flexible joints are preferably spaced along the length of the inner shaft, since one may be used to offset the inner shaft relative to the outer shaft, and the other may be used to adjust the orientation of the end of the inner shaft so that it is parallel to the outer shaft. With such an adjustment an article to be machined is properly positioned to engage the cutting tool. In the preferred embodiment either or both of the flexible joints comprises a ball and socket positioned along the shaft. To ensure that the inner shaft does not rotate at the flexible joints, the outer surface of the ball and the inner surface of the socket at each joint is provided with a splined surface. Thus, when the ball is positioned in the socket, the interconnection of the splined areas prevent relative rotation between the ball and socket at the joints.

For the purpose of providing a simultaneous difference in speed of the inner and outer shafts a gearing mechanism is operatively connected to the shafts. Each shaft is affixed to a gear, and each shaft gear meshes with an adjacent gear, the adjacent gears being fast to each other. The variation in speed between shafts is adjusted by independently varying the ratio of the gears to either shaft. In this manner integral ratios of 2:1, 3:1, 4:1, etc. are readily accomplished between the shafts.

To the accomplishment of the above, and to such other objects as may hereinafter appear, the present invention relates to the construction of an apparatus for machining noncircular shapes on an article, as defined in the appended claims, and as described in this specification, taken together with the accompanying drawings in which:

FIG. 1 is a side elevational view partly in section of an apparatus typical of the invention;

FIG. 2 is a front elevational view partly in section taken on line 2—2 of FIG. 1;

FIG. 3 is a fragmentary view of the component parts of a particular embodiment of a flexible joint employed on the inner shaft of the apparatus of FIG. 1;

FIG. 4 is a side elevational view partly in section of another embodiment of the apparatus of the invention;

FIG. 5 is a front elevational view partly in section taken on the line 5—5 of FIG. 4; and FIG. 6 is a fragmentary view partly in section, taken on the line 6—6 of FIG. 5.

Referring to the drawings, in FIG. 1 an apparatus which is employed to provide noncircular shapes on articles is generally designated by the numeral 10. This apparatus 10 may be an ordinary lathe or similar device which is adapted to include an inner shaft 12 located inside an outer shaft 14. The inner shaft is supported within outer shaft 14 by means such as bearings 16 and 18. The inner shaft 12 includes two flexible joints 20 and 22, as illustrated. The joint 20 is flexed so that the inner shaft 12 is offset or eccentrically positioned at one end 24 relative to the axis of rotation 25 of the outer shaft 14. The joint 22 is flexed so as to enable the end portion 24 of the inner shaft 12 to be aligned substantially parallel with the outer shaft 14. Stated differently, the axis of rotation 27 of the end 24 of the inner shaft 12 is substantially parallel with the axis of rotation 25 of the outer shaft 14 and eccentrically positioned relative thereto. The end 24 of the inner shaft 12 is here illustrated as extending beyond the end 26 of the outer shaft 14, and is connected to a holding means which is illustrated as a chuck 28. The article to be shaped, generally designated 30, is held in the chuck 28 and is positioned adjacent a cutting tool 32 which is mounted in the holder 34. The end 24 of the inner shaft 12 is also mounted within the structure generally designated 36 which comprises a bearing 18, a ring 38 and a tube 40. The bearing 18 is mounted about the end 24 of the inner shaft 12 and the ring 38 is mounted about the outer race 35 of the bearing 18. The ring 38 is held against the tube 40 by means of bolts 42 and the tube 40 is secured to the outer shaft 14 at position 44.

At the opposite end of the two shafts 12 and 14, a gearing mechanism generally 46 includes a base member 48, a shaft 50 and a plurality of gears 52, 54, 56 and 58. Gear 56 is fast on the outer shaft 14, while gear 58 is fast on the inner shaft 12. Each of these gears 56 and 58 rotates independently of the other. Gears 52 and 54 which are fast to each other are mounted on the stationary shaft 50 and are rotated together thereon. As illustrated, the sizes of the several gears differ and therefore the inner and outer shafts are rotated at different speeds. A motor 49 is operatively connected to a belt holder 51 on which one end of a belt 53 is placed. The other end of the belt 53 is placed on belt holder 55 which is fast on outer shaft 14. The motor 49 drives the shaft 14 at a speed which varies with the position of belt 53 on holders 51 and 55.

As shown in FIG. 2, the ring 38 is eccentrically positioned relative to the tube 40, and is movably mounted on the tube 40 by means of bolts 42. Ring 38 is provided with slotted grooves 60 and 62 which permit an adjustment of the position of ring 38 relative to the tube 40 in a direction indicated by the arrow 41. The adjustment is readily accomplished by simply loosening the bolts 42, repositioning the ring 38 and then tightening the bolts 42 in the grooves 60 and 62. Since the ring 38 is nonrotatably fastened to the bearing 18 which in turn is attached to the end 24 of the inner shaft 12, the inner shaft end 24 is also repositioned by the movement of the ring 38 relative to the tube 40. The repositioning of the inner shaft end 24 in the direction of the arrow 41 varies the degree of eccentricity of the shaft end 24 with respect to the outer shaft 14. In this manner, the degree of eccentricity may be adjusted externally of both shafts by adjusting the structure 36.

It will be noted that the tube 40 is actually an extension of the outer shaft 14 and thus the rotative motion of the shaft 14 is carried through tube 40 to the ring 38. Since the inner shaft end 24 is mounted within the bearing 18 and the ring 38, the motion of the outer shaft is effectively superimposed on the rotative motion of the inner shaft. Thus during the operation of the apparatus, the rotative motion of the outer shaft 14 causes the inner shaft 12 as it rotates to traverse a cyclical path relative to the axis of rotation 25 of the outer shaft 14. As before explained the particular path traversed is varied by varying the ratio of shaft speeds.

FIG. 3 is a fragmentary view of the component parts of one embodiment of a flexible joint such as those shown at 20 and 22 in FIG. 1. The joint illustrated in FIG. 3 is constructed with a ball 64 and socket 66, each respectively connected to a different section of the inner shaft 12, for example shaft sections 21 and 23 in FIG. 1. The outer surface of the ball 64 is provided with splined segments 68 while the inner surface of the socket 66 is provided with mating splined segments 70. When the ball 64 is positioned within the socket 66 and the splined segments 68 and 70 are interlocked and relative rotation of the two members about the axis of rotation of the inner shaft is prevented. However, the joint is still flexible; angular movement of the ball 64 relative to the socket 66 is easily accomplished. Any number of these joints may be provided on the inner shaft 12 but it has been found preferable to employ two such joints as shown in FIG. 1. As before explained, the joint 20 is used to eccentrically position the inner shaft end 24 while the joint 22 is used to horizontally position that end 24 and thus properly orient the article 30 and chuck 28 relative to the cutting tool 32.

FIG. 4 illustrates another embodiment of the apparatus, differing from the embodiment of FIGS. 1—3 specifically with reference to the end mechanism generally designated 71. As shown in FIG. 4, the end 24 of the inner shaft 12 is carried within two bearings 72 and 74. A tube 76 is mounted about these bearings and inside another tube 78. The tube 78 is provided with a flanged end section 80 which is placed in abutment with the annular ring 82. The ring 82 is fastened to the outer shaft 14 at 84. As described with reference to mechanism 36 in FIG. 1, the mechanism 71 serves to provide an adjustable means for eccentrically locating the inner shaft end 24 with respect to the outer shaft 14. In addition, however, as was the situation with the mechanism 36 in FIG. 1, the rotation of the outer shaft 14 is superimposed on the rotation of the inner shaft 12 through this mechanism. This is primarily accomplished by means of the bearings 72 and 74 which operate in conjunction with the tubes 76, 78 and the ring 82.

As shown in FIGS. 5 and 6 the flanged section 80 of tube 78 is provided with dovetailed edges 86, while the ring 82 is provided with an undercut groove 88. The dovetailed edges 86 of the flanged section 80 fit into the undercut groove 88 in the ring 82, thus enabling the flanged section 80 to be adjustably positioned within the groove 88 in the direction of the arrow 90. The two parts 92, 94 are removably positioned in the ring 82 and are maintained in position by means of the bolts 96 and 98. In order to effect a repositioning of the flanged section 80 within the groove 88 the bolts 96, 98 are loosened permitting movement of flanged section 80 in the groove 88. When the new position is obtained the bolts are tightened to lock the flanged section 80 with respect to the ring 82, and thus the shaft 12 with respect to the shaft 14, as explained with reference to FIG. 4.

In the operation of the apparatus illustrated in FIGS. 1 and 4, the workpiece 30 is positioned in the chuck 28 adjacent the cutting tool 32. The inner shaft is then flexed to a desired position by adjusting the relative positions of the movable parts in the mechanisms 36 and 71 at the end portion 24 of the inner shaft 12. As before explained, the degree of eccentricity of that inner shaft end portion 24 relative to the outer shaft 14 will determine the depth of the cut of the various noncircular configurations which may be provided on the article 30. The shafts are then rotated at the desired speeds and the workpiece is cut by engaging it with the cutting tool 32. A variety of configurations are obtainable by varying the ratios of the shaft speeds. For customary shapes the inner shaft 12 will be rotated more rapidly than the outer shaft 14, but additional configurations are obtained by reversing the ratios, that is by turning the inner shaft at a slower speed than the outer shaft. Generally, the cutting operation is carried out quickly and thus has been determined to be extremely accurate in imparting a properly dimensioned profile to the article.

It will be appreciated that the apparatus described is quite simple, and that any ordinary lathe or equivalent device can be readily adapted to function in the manner described. The use of a flexible inner shaft obviates the necessity of including complex eccentric holding means or other elaborately structured rotating parts which are currently used to obtain the same result. Furthermore, by a simple manual adjustment of the position of the inner shaft which is effected externally of both shafts, size of the final product is altered.

I claim:

1. An apparatus for rotating an article relative to a cutting means and effective to cause a noncircular shape to be imparted to said article comprising a rotatable outer shaft, an inner shaft positioned within said outer shaft and rotatable relative thereto, holding means effective to hold the article to be shaped, said holding means being operatively connected to said inner shaft at one end thereof, means effective to flex said inner shaft such that the axis of rotation of the end of said inner shaft connected to said holding means is eccentrically positioned relative to the axis of rotation of said outer shaft when said shafts are rotated, adjustable means operatively connecting said one end of said inner shaft to said outer shaft and effective to adjustably, eccentrically position said inner shaft relative to said outer shaft and to cyclically move said inner shaft end relative to the rotational axis of said outer shaft as said outer shaft rotates, and driving means operatively connected to said outer shaft and said inner shaft and effective to drive said shafts at different rotational speeds, whereby said holding means is rotated at one rotative speed and is eccentrically moved at a different rotative speed, whereupon when an article is held in said holding means and engages said cutting means while said holding means is so rotated a noncircular shape is imparted to said article.

2. The apparatus of claim 1, in which said means to flex said inner shaft comprises a flexible joint comprising first and second parts rotatively affixed to each other and angularly movable relative to each other, said inner shaft comprising first and second sections connected to said first and second parts respectively, and to said driving means and said inner shaft end respectively.

3. The apparatus of claim 2, in which said first and second parts comprise a ball and socket, the ball being connected to one section of the inner shaft and the socket being connected to the other section of the inner shaft, said ball having a splined outer surface and said socket having a splined inner surface whereupon when said ball engages said socket, relative rotation between the ball and socket about the axis of rotation of the inner shaft is prevented.

4. In the apparatus of claim 2, a second flexible joint positioned between said first flexible joint and the end of said inner shaft to which said holding means is operatively connected, whereupon when said second flexible joint is flexed the axis of rotation of said end of the inner shaft is substantially parallel to the axis of rotation of said outer shaft while eccentrically positioned relative thereto.

5. The apparatus of claim 4, in which said second flexible joint comprises a ball and socket, the ball being connected to one section of the inner shaft and the socket being connnected to the other section of the inner shaft, said ball having a splined outer surface and said socket having a splined inner surface whereupon when said ball engages said socket, relative rotation between the ball and socket about the axis of rotation of the inner shaft is prevented.

6. In the apparatus of claim 1, said adjustable means comprising a bearing mounted about said inner shaft adjacent said one end, a first member operatively connnected to said bearing, a second member operatively connected to said outer shaft, and means for movably connecting said first member to said second member whereupon when said first member is moved relative to said second member said one end of said inner shaft is moved relative to said outer shaft, thereby altering the degree of eccentricity of said inner shaft relative to said outer shaft.

7. In the apparatus of claim 6, in which said means for movably connecting said first member to said second member comprises at least one slotted groove in said first member and bolting means adjustably positioned in said groove and extending into said second member.

8. The apparatus of claim 7, in which said first member is an annular ring mounted about the outer race of said bearing and said second member is a tube having one end thereof in engagement with said ring and having the other end thereof mounted on said outer shaft.

9. The apparatus of claim 6, in which said first member is connected to said second member in a dovetail joint, said first member being movable relative to said second member at said joint.

10. The apparatus of claim 9, in which said first member is a tube having a flanged end section, said flanged end section having dovetail-shaped opposite edges, and said second member is an annular ring having a groove therein, said groove being undercut to receive said dovetail edges on said flanged section, thereby to form said dovetail joint.

11. In the apparatus of claim 10, two parts adjustably connected to said ring, said parts defining said undercut groove and being adapted to receive said flanged end section in a position within said groove and to lock said flanged end section in said position.

12. In the apparatus of claim 3, said adjustable means comprising a bearing mounted about said inner shaft adjacent said one end, a first member operatively connected to said bearing, a second member operatively connected to said outer shaft, and means for movably connecting said first member to said second member whereupon when said first member is moved relative to said second member said one end of said inner shaft is moved relative to said outer shaft, thereby altering the degree of eccentricity of said inner shaft relative to said outer shaft.

13. In the apparatus of claim 12, in which said means for movably connecting said first member to said second member comprises at least one slotted groove in said first member and bolting means adjustably positioned in said groove and extending into said second member.

14. The apparatus of claim 12, in which said first member is connected to said second member in a dovetail joint, said first member being movable relative to said second member at said joint.

15. In the apparatus of claim 4, said adjustable means comprising a bearing mounted about said inner shaft adjacent said one end, a first member operatively connected to said bearing, a second member operatively connected to said outer shaft, and means for movably connecting said first member to said second member whereupon when said first member is moved relative to said second member said one end of said inner shaft is moved relative to said outer shaft, thereby altering the degree of eccentricity of said inner shaft relative to said outer shaft.